July 9, 1946. H. K. GROWALD 2,403,595
AIRCRAFT
Filed Dec. 31, 1942 4 Sheets-Sheet 4
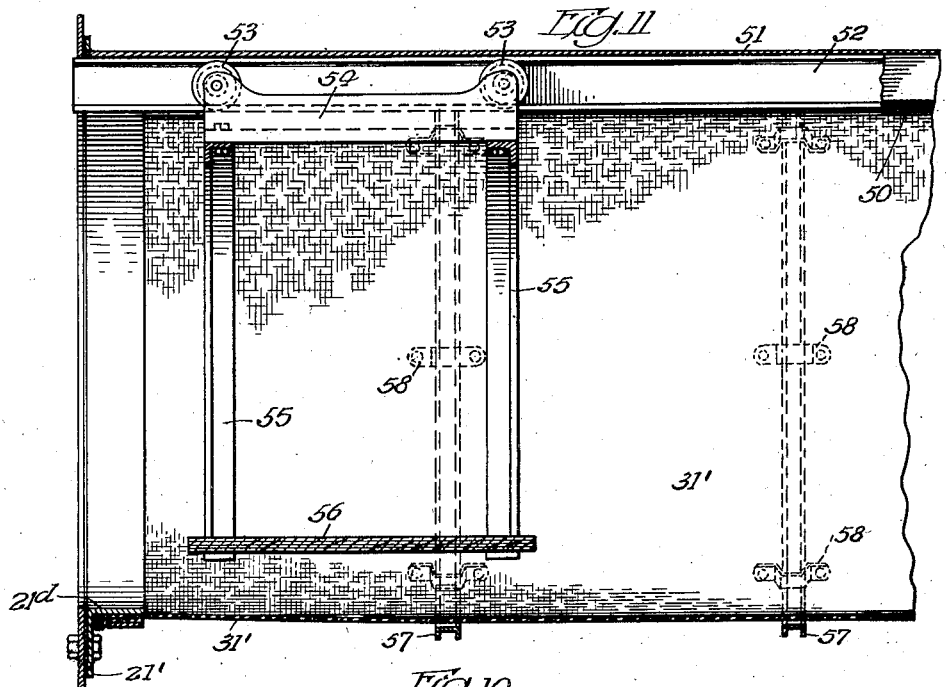
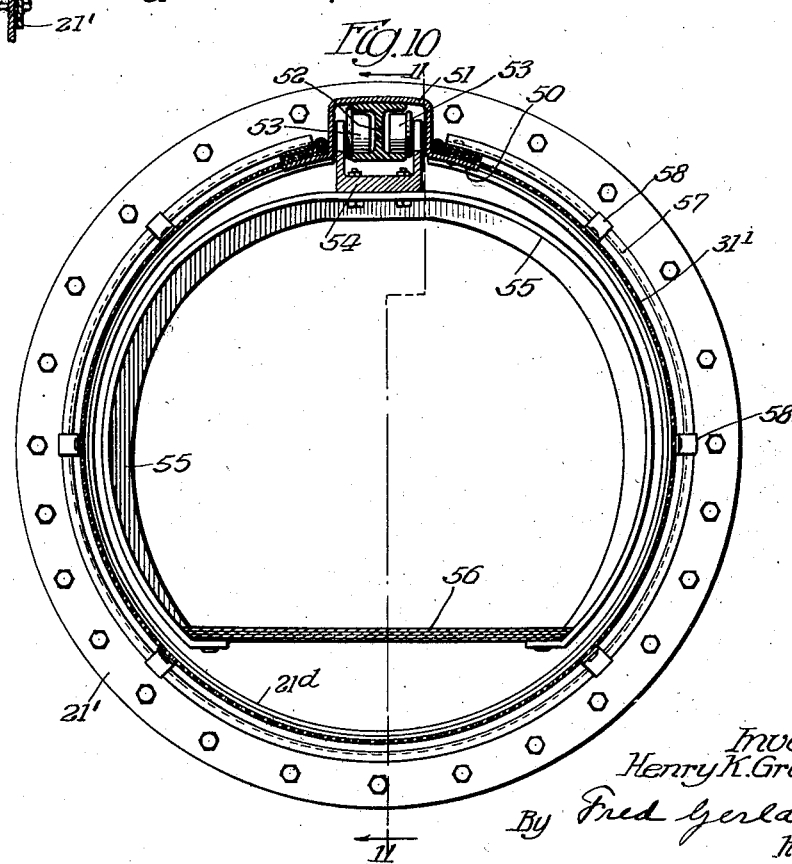
Inventor
Henry K. Growald
By Fred Gerlach
his Atty Patented July 9, 1946

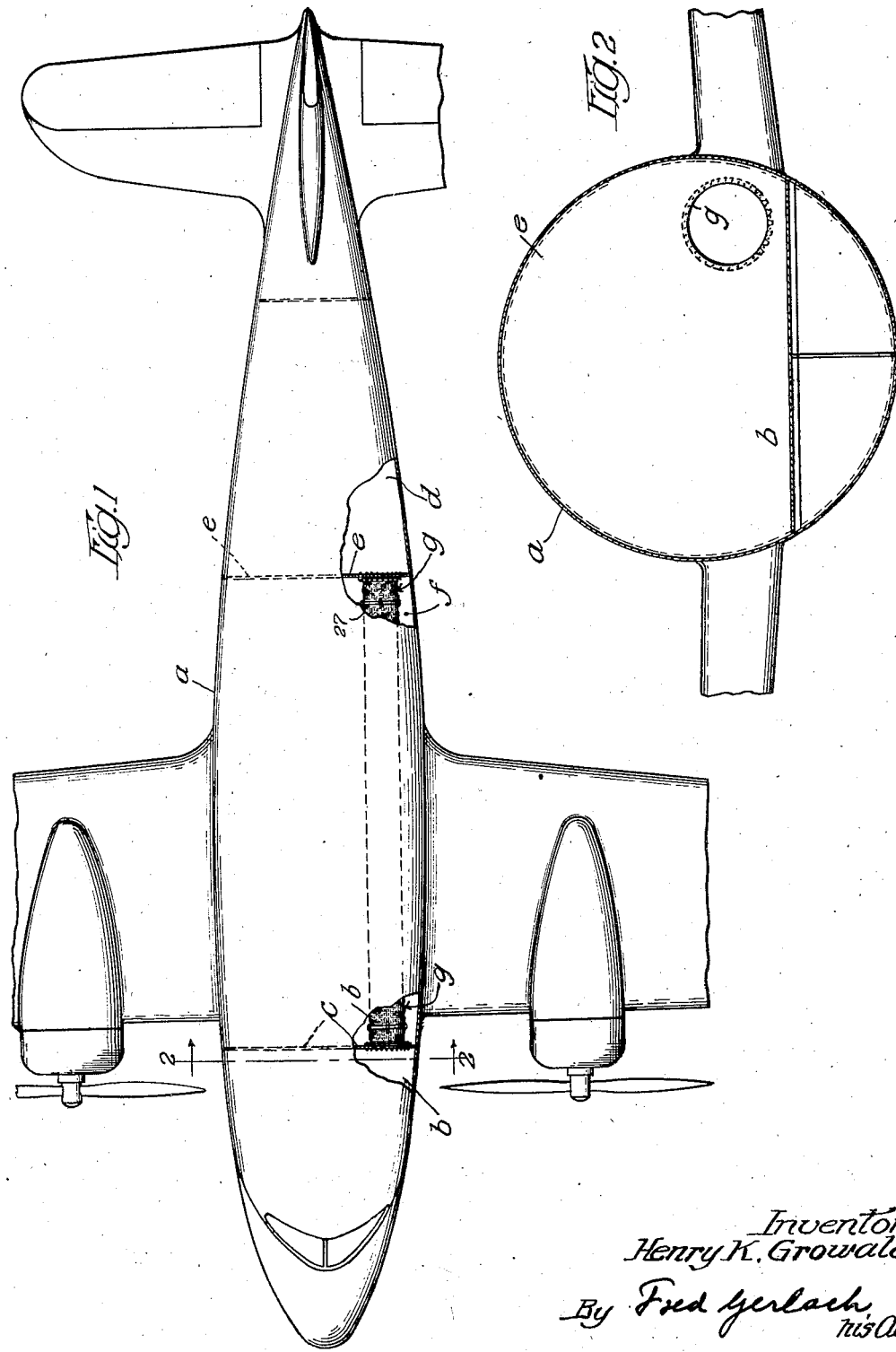

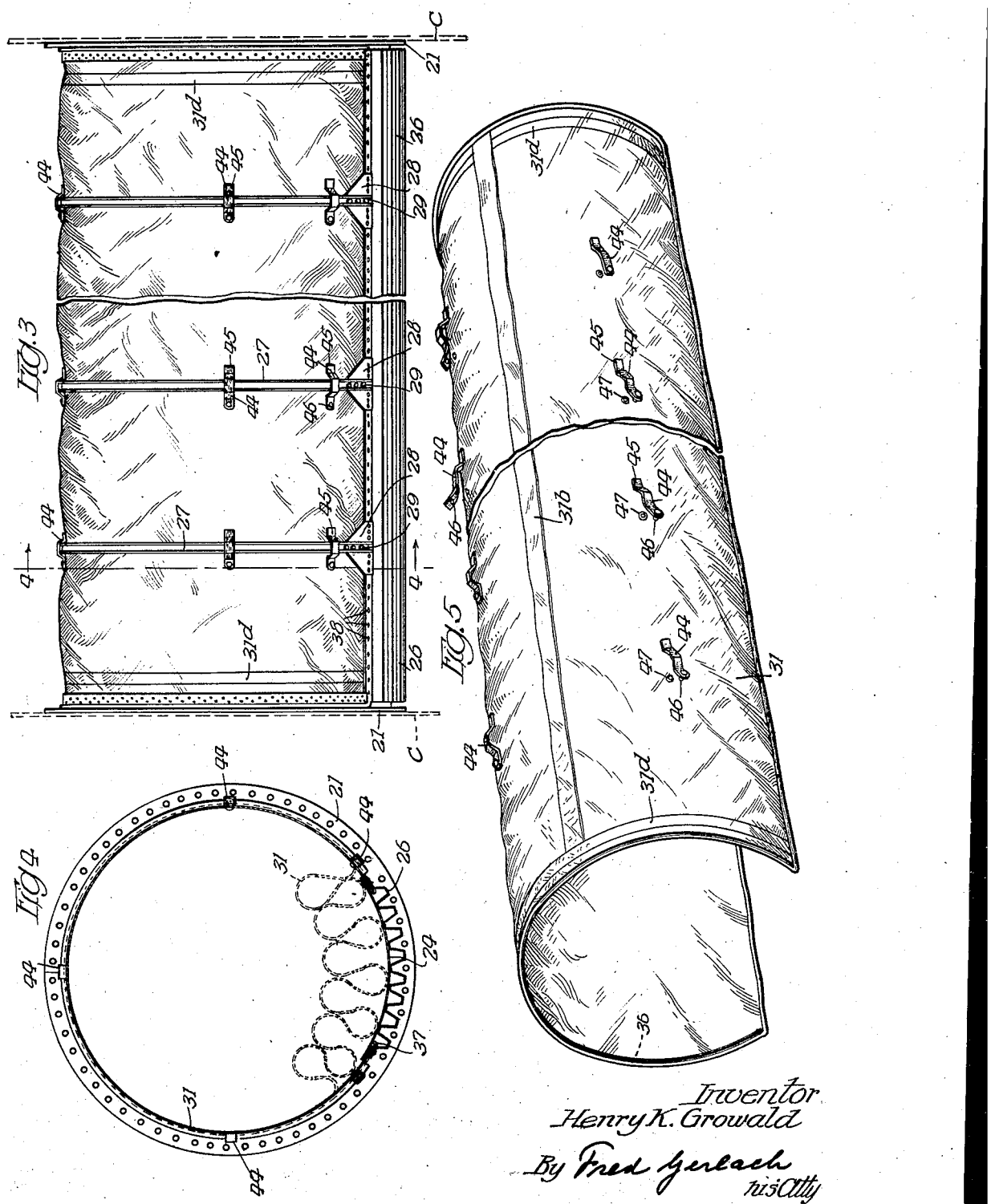

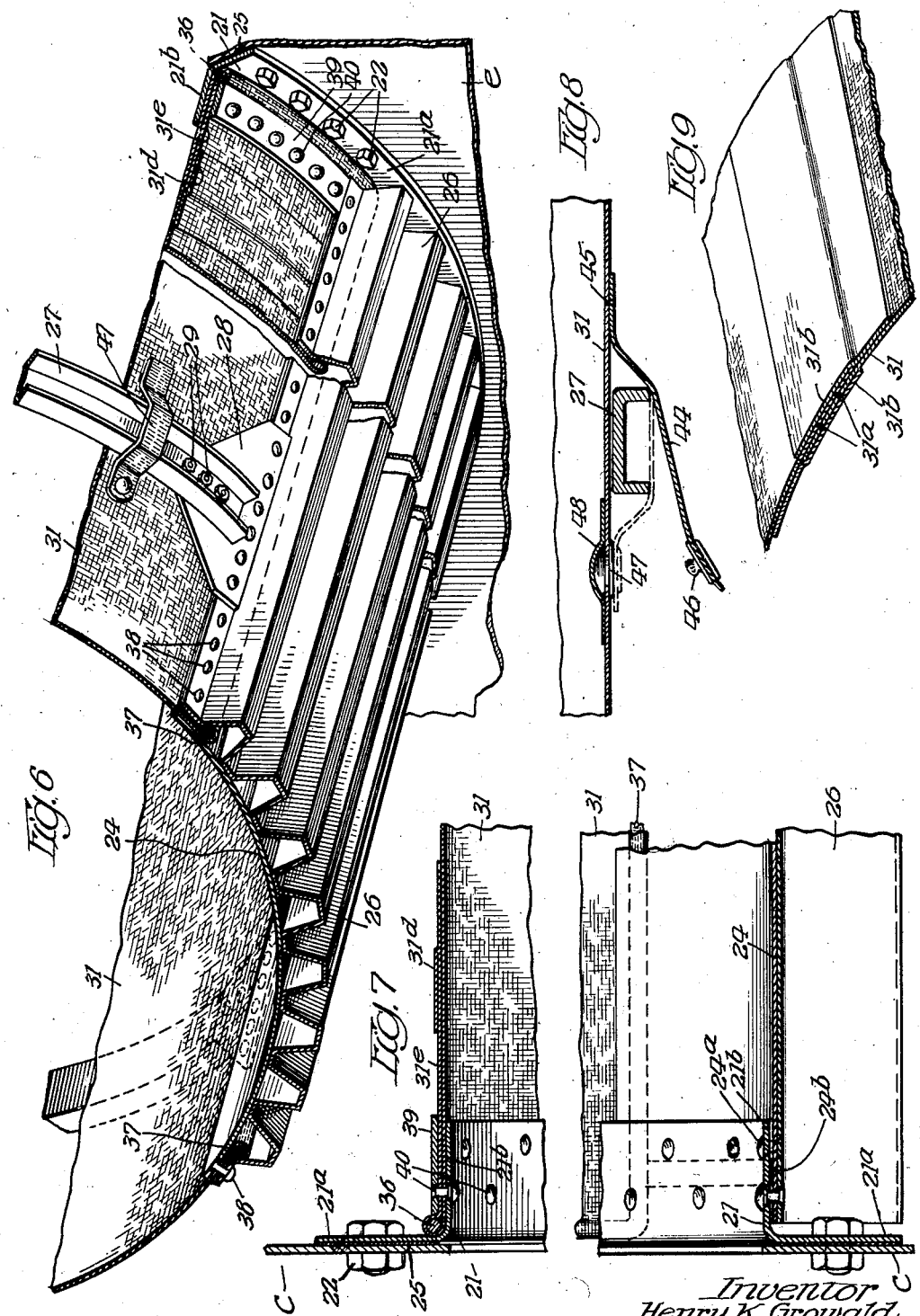

2,403,595

UNITED STATES PATENT OFFICE 2,403,595

AIRCRAFT

Henry K. Growald, Fort Worth, Tex., assignor to Consolidated Vultee Aircraft Corporation, a corporation of Delaware Application December 31, 1942, Serial No. 470,843

14 Claims. (Cl. 244—118)

The invention relates to aircraft, and more particularly to aircraft provided with airtight compartments which are adapted to be pressurized or supercharged when flying at high altitudes.

In such aircraft it is desirable to provide pressurizable compartments in different portions of the body or fuselage, for example, a front cabin for the pilot, co-pilot, navigator and other command personnel, and a rear cabin or compartment for other members of the crew, with an intermediate space or compartment for carrying bombs or other cargo which does not require pressurizing or supercharging. In such aircraft it is desirable to provide for the transfer of personnel or supplies between the pressurized compartments during travel at high altitude, without loss of pressure in these compartments. It is also desirable to provide a communicating conduit between the fore and aft pressurized compartments which, when the airplane is being serviced on the ground, will occupy the minimum space in order to avoid interference with loading and such operations, and a structure which forms a conduit which is light in weight.

One object of the invention is to provide, in aircraft having pressurizable compartments which are separated from each other, a communicating conduit which extends between said compartments and through the intermediate non-pressurized area in the fuselage, and comprises a flexible section which is collapsible when it is not in use, and can be readily expanded for use when the compartments are pressurized.

Another object of the invention is to provide a conduit for this purpose which has a lower rigid or metallic section which functions as a platform or floor for a flexible collapsible section between the pressurized compartments.

Another object of the invention is to provide a light-weight construction for an aircraft communication conduit.

Another object of the invention is to provide a communication conduit between pressurized compartments which comprises a flexible tubular member and a carriage for transporting a load through the conduit and from one compartment to the other.

Other objects of the invention will appear from the detailed description.

The invention consists in the several novel features which are hereinafter set forth and are more particularly defined by claims at the conclusion hereof.

In the drawings:

Fig. 1 is a plan of an airplane embodying the invention.

Fig. 2 is a section taken on line 2—2 of Fig. 1.

Fig. 3 is a side elevation of the conduit.

Fig. 4 is a section of the conduit taken on line 4—4 of Fig. 3.

Fig. 5 is a perspective of the flexible section of the conduit.

Fig. 6 is a sectional perspective of a portion of the conduit.

Fig. 7 is a vertical section through one end portion of the conduit.

Fig. 8 is a sectional view showing one of the fasteners for the flexible section.

Fig. 9 is a sectional perspective showing a seam in the flexible section of the conduit.

Fig. 10 is a transverse section of another form of the invention.

Fig. 11 is a section taken on line 11—11 of Fig. 10 illustrating one end portion of the conduit.

The invention is exemplified as applied to an airplane comprising a body or fuselage $a$; a pilot's cabin or compartment $b$ in front of a bulkhead $c$; a compartment $d$ at the rear of bulkhead $e$; a bay or compartment $f$ between the bulkheads $c$ and $e$; and a conduit $g$ between the compartments $b$ and $d$. The compartments $b$ and $d$ for the crew are sealed so they can be pressurized or supercharged as, and by any suitable means, well known in the art. The conduit $g$ provides a communicating passage between the pressurized compartments $b$ and $d$ and is open to the pressure in said compartments. The compartment $f$ between compartments $b$ and $d$ usually contains bomb racks, hoisting and loading equipment or other mechanisms, and having large doors or hatches, therefore is not adapted for pressurization.

The conduit $g$ comprises a lower rigid or metallic section which is adapted to serve as a floor or platform over which a person can pass between the pressurized compartments $b$ and $d$ and a flexible member which forms a collapsible closure for the portion of the passage above the platform.

The conduit $g$ extends longitudinally between the bulkheads $c$ and $e$, preferably adjacent one side of the fuselage about and slightly above the level of the usual floor in the cabin $b$. This locates the conduit where it will offer minimum interference with operations in the intermediate space $f$. The conduit comprises a substantially rigid arcuate lower section 24 of sheet metal and a circumferentially extending flexible member 31 which is formed of thin highly flexible material, such as impregnated or rubberized fabric or other suitable material which is adapted to retain air. A corrugated member 26 of sheet metal extends under and reinforces the plate 24. The contacting crests of the corrugations are spot-welded or riveted to the floor-plate. Plates 24 and 26 form a substantially rigid lower section of the conduit for supporting a person in transit between compartments $b$ and $d$. The flexible member 31 when extended or inflated to approximately cylindrical contour, forms the upper portion of the conduit. The sections form an airtight tubular or substantially cylindrical conduit between the bulkheads $c$ and $e$. The adjacent longitudinal margins of flexible member 31 and plates 24 and 26 are secured together by airtight joints. For this purpose, each longitudinal margin of flexible member 31 is looped around a reinforcing cord or rope 37 and lapped upon itself to form a marginal portion of double thickness of material. This marginal portion fits between the longitudinal margins of plates 24 and 26. Rivets 38 extend through said plates and the marginal portion and double thickness of the member 31 outwardly of the cord 37 to form a sealed or airtight closure between the lapped longitudinal margins of the flexible and rigid sections of the conduit.

Each end of the flexible and rigid sections of the conduit is secured to a ring 21 of angular cross-section, which is secured by bolts 22 to one of the bulkheads $c$, $e$. Each ring 21 has a vertical flange $21^a$ through which the bolts 22 pass. A packing ring or gasket 25 of rubber or other suitable packing is clamped between each flange $21^a$ and one of the bulkheads to form airtight seals between the rings and the bulkheads. Each ring 21 has a horizontal flange $21^b$ to which the ends of the flexible and rigid sections of the conduit are secured.

Bottom-plate 24 is arcuate conformably to the outer periphery of flange $21^b$ and its ends underlie the flanges $21^b$ on the rings 21. The end portions of the reinforcing plate 26 also underlie the end-portions of plate 24 and the flanges $21^b$ of one of the rings 21. Rivets $24^a$ extend through flanges $21^b$ and plates 24 and 26 so that said plates will be supported from the rings 21. An elastic sealing strip $24^b$ between the outer periphery of flange $21^b$ and the plate 24 provides an airtight seal between the ring 26 and the plate 24.

Each end of the flexible member 31 is folded around a reinforcing cord or rope 36 and is overlapped as at $31^e$ to provide a portion of double thickness of material which extends circumferentially around the outer periphery of the flange $21^b$. A flat band 39 extends around each end portion of the flexible member 31 which is seated on a flange $21^b$, and inwardly of the reinforcing cord 36. Rivets 40 which extend through bands 39, the double thickness of material in member 31, and the horizontal flanges $21^b$ of a ring 21, secure the ends of the flexible member to the rings 21, respectively. The rubberized material in member 31 seals the joint between said member and the ring 21. A reinforcing and sealing strip $31^d$ is cemented around the margin of the folded portion $31^e$ of the flexible material of section 31.

The flexible member 31, which must be of considerable length to cross the span between the bulkheads $c$ and $e$, is usually made up of lengths of fabric 31 which are joined together by airtight joints which are formed by overlapping and stitching and/or cementing together the sheets as at $31^a$, and cementing rubberized strips $31^b$ over the seams, as illustrated in Fig. 9. A series of ribs or arched members 27 are shaped to extend circumferentially around the flexible member 31 when it is extended and to support said member in approximately cylindrical contour when not pressurized. Ribs 27 are U-shaped in cross section. Each of the lower ends of ribs 27 is secured by screws 29 to a gusset plate 28, which is secured by some of the rivets 38 to the plates 24, 26 and the lower margins of the flexible section 31. In this manner these ribs are fixedly supported from the lower fixed section of the conduit.

The flexible member 31 is adapted to be held to approximately cylindrical contour from the ribs 27 by straps or tabs 44 which are adapted to be lapped around ribs 27 when the conduit is to be and is pressurized, and to be disconnected from the ribs when it is desired to collapse the flexible member 31 so that the space occupied by it when inflated will be rendered available so far as possible for operations in the compartment $f$. Each strap 44 has one of its ends suitably secured, as at 45, to the fabric of member 31 and is adapted to extend around the outside of a ring 27. Each strap is provided at its free end with a member 46 of a snap-fastener. The other member 47 of each snap-fastener is secured to the fabric of member 31. The inside of member 47 is covered with rubberized fabric 48 to form an airtight seal between the member 47 of the snap-fastener and the fabric of member 31. When it is desired to collapse the fabric of member 31 the straps 44 will be disconnected at the snap-fasteners so that member 31 will be free to collapse and rest in folds on the rigid section of the conduit. The fullness in the flexible member 31 permits the portion between its ends to collapse so it can be folded to rest on the floor-plate 24, as indicated by dotted lines in Fig. 4.

In the use of the conduit, the flexible member, while the compartments $b$ and $d$ are supercharged, can be held in approximately cylindrical contour by the straps 44, which will support the member between its ends, from the ribs 27. The supercharge pressure in said compartments will hold the flexible member extended and a person can readily pass through the conduit supported by the plate 24 when it is desired to pass from one of the pressurized compartments to the other. When said compartments are not pressurized and the conduit is not to be used, the straps 44 can be detached at fasteners 46, 47 so that the flexible member between its ends can sag into folds resting on the bottom plate 24, as illustrated by dotted lines in Fig. 4.

The form of the invention illustrated in Figs. 10 and 11 comprises a tubular member 31' of thin flexible material, the ends of which are secured and sealed to horizontal flanges $21^d$ of end rings 21' substantially in the same manner as previously described. The longitudinal margins of the tubular member are reinforced as before described, disposed at the upper portion of the tube, and lapped over and secured to flanges 50 of a channel-member 51 which extends longitudinally and continuously between the end rings 21' and is welded or otherwise fixed to vertical flanges on said rings. A beam 52, having channels in its sides and of H cross-section has its top flange fixedly secured to the top wall of channel-member 51 and forms a supporting monorail for a portable carriage adapted to transport a passenger or other load longitudinally through the communication tube. This carriage comprises pair of wheels 53 adapted to travel in the channels in the sides of beam 52 and on the lower flanges of said beam, a hanger bracket 54 suspended from wheels 53, suspension bars 55 secured to bracket 54 and curved approximately to conform to the tubular member 31', and a platform or support 56 secured on the lower inturned ends of bars 55. In this construction, the member 51 and beam 52 provide a rigid overhead support from which the carriage is suspended. In the use of this form of the invention, the passenger or load is carried on the platform 56 and the carriage may be shifted manually by the passenger or may be pulled through the conduit by a rope or cable tied to the carriage. Ribs 57 extend circumferentially around the member 31' of flexible material and are detachably secured thereto by straps 58 provided with snap fasteners and of the construction previously described, for supporting the tubular member when it is pressurized. This form of the invention exemplifies one in which a portable load carrying platform or carriage is supported by a rigid member for travel through the conduit and between compartments to which the conduit is connected.

The conduit exemplifies a construction which is lighter in weight than a metallic tube. In the event of a puncture, the flexible member 31 can be easily repaired by a rubber patch, while a metallic tube presents difficulty in making such a repair. When the flexible member is collapsed, it offers the minimum interference with operations between the bay which is not pressurized.

The invention is not to be understood as restricted to the details set forth, since these may be modified within the scope of the appended claims without departing from the spirit and scope of the invention.

Having thus described the invention, what I claim as new and desire to secure by Letters Patent is:

1. An airplane comprising: rigid bulkheads for compartments which are spaced apart and adapted to be pressurized for altitude flying and occupancy by personnel; and a tubular conduit for transportation of loads or personnel extending between the bulkheads, said conduit including a collapsible member of flexible material, and airtight joints connecting the ends of the flexible member to said bulkheads, respectively, said member being collapsible transversely of the conduit intermediate said ends to reduce the area in the space between the bulkheads occupied by the conduit when it is not pressurized.

2. An airplane comprising: rigid bulkheads for compartments which are spaced apart and adapted to be pressurized for altitude flying and occupancy by personnel; and a tubular conduit for transportation of loads or personnel extending between the bulkheads, said conduit including a collapsible member of flexible material, airtight joints connecting the ends of the flexible member to said bulkheads, respectively, said member being collapsible transversely of the conduit intermediate said ends to reduce the area in the space between the bulkheads occupied by the conduit when it is not pressurized, and means detachable from and for holding the flexible member expanded when the conduit is not pressurized.

3. An airplane comprising: rigid bulkheads for compartments which are spaced apart and adapted to be pressurized for altitude flying and occupancy by personnel; and a tubular conduit for transportation of loads or personnel extending between the bulkheads of said compartments, said conduit including a collapsible section of flexible material and a substantially rigid floor section, and airtight joints connecting the ends of the flexible section to said bulkheads, respectively, said flexible section being collapsible transversely of the conduit intermediate said ends and over the floor section to reduce the area in the space between the bulkheads occupied by the conduit when it is not pressurized.

4. An airplane comprising: rigid bulkheads for compartments which are spaced apart and adapted to be pressurized for altitude flying and occupancy by personnel; and a tubular conduit for transportation of loads or personnel extending between the bulkheads of said compartments, said conduit including a collapsible section of flexible material and a substantially rigid floor section, airtight joints connecting the ends of the flexible section to said bulkheads, respectively, said flexible section being collapsible transversely of the conduit intermediate said ends and over the floor section to reduce the area in the space between the bulkheads occupied by the conduit when it is not pressurized, and means detachable from and for holding the flexible section expanded when the conduit is not pressurized.

5. An airplane comprising: rigid bulkheads for compartments which are spaced apart and adapted to be pressurized for altitude flying and occupancy by personnel; and a tubular conduit for transportation of loads or personnel extending between the bulkheads of said compartments, said conduit including a collapsible section of flexible material, a substantially rigid floor-section, and airtight joints connecting the ends of the flexible section to said bulkheads, respectively, said flexible section being collapsible transversely of the conduit intermediate said ends and over the floor-section to reduce the area in the space between the bulkheads occupied by the conduit when it is not pressurized and having its side margins sealed to the floor-section.

6. An airplane comprising: rigid bulkheads for compartments which are spaced apart and adapted to be pressurized for altitude flying and occupancy by personnel; and a tubular conduit for transportation of loads or personnel extending between the bulkheads of said compartments, said conduit including a collapsible section of flexible material, a substantially rigid floor-section, airtight joints connecting the ends of the flexible section to said bulkheads, respectively, said flexible section being collapsible transversely of the conduit intermediate said ends and over the floor-section to reduce the area in the space between the bulkheads occupied by the conduit when it is not pressurized and having its side margins sealed to the floor-section; and means for detachably holding the flexible section expanded when the conduit is not pressurized.

7. An airplane comprising: rigid bulkheads for compartments which are spaced apart and adapted to be pressurized for altitude flying and occupancy by personnel; and a tubular conduit for transportation of loads or personnel extending between the bulkheads of said compartments, said conduit including a collapsible section of flexible material, a substantially rigid floor-section, airtight joints connecting the ends of the flexible section to said bulkheads, respectively, said flexible section being collapsible transversely of the conduit intermediate said ends to reduce the area in the space between the bulkheads occupied by the conduit when it is not pressurized and having its side margins sealed to the floor-section; substantially rigid ribs secured to the floor-section and extending around the flexible section; and means for detachably holding the flexible section expanded when the conduit is not pressurized.

8. An airplane comprising: rigid bulkheads for compartments which are spaced apart and adapted to be pressurized for altitude flying and occupancy by personnel; and a tubular conduit for transportation of loads or personnel extending between the bulkheads of said compartments, said conduit including a collapsible member of flexible material, airtight joints connecting the ends of the flexible member to said bulkheads, respectively, said member being collapsible transversely of the conduit intermediate said ends to reduce the area in the space between the bulkheads occupied by the conduit when it is not pressurized, substantially rigid ribs extending around the flexible member, and means between the ribs and the flexible member for holding said member expanded when the conduit is not pressurized.

9. An airplane comprising: rigid bulkheads for compartments which are spaced apart and adapted to be pressurized for altitude flying and for occupancy by personnel; and a tubular conduit for transportation of loads or personnel extending between the bulkheads, said conduit including a collapsible section of flexible material, a substantially rigid floor-section having its side margins sealed to the side margins of the flexible section, and rings at the ends of the conduit and secured to the bulkheads, means for sealing the ends of the flexible-section to and supporting the ends of the floor-section on said rings, said flexible section being collapsible transversely of the conduit intermediate said ends to reduce the area in the space between the bulkheads occupied by the conduit when it is not pressurized.

10. An airplane comprising: rigid bulkheads for compartments which are spaced apart and adapted to be pressurized for altitude flying and for occupancy by personnel; and a tubular conduit for transportation of loads or personnel extending between the bulkheads, said conduit including a collapsible section of flexible material, a substantially rigid floor-section having its side margins sealed to the side margins of the flexible section, rings at the ends of the conduit and secured to the bulkheads, means for sealing the ends of the flexible section to and supporting the ends of the floor-section on said rings, said flexible section being collapsible transversely of the conduit intermediate its ends to reduce the area in the space between the bulkheads occupied by the conduit when it is not pressurized, substantially rigid ribs extending around the flexible section and supported on the floor-section, and means between the ribs and the flexible section for detachably holding the flexible section expanded when the conduit is not pressurized.

11. An airplane comprising: rigid bulkheads for compartments which are spaced apart and adapted to be pressurized for altitude flying and for occupancy by personnel; and a tubular conduit for transportation of loads or personnel extending between the bulkheads, said conduit including a collapsible section of flexible material, a floor-section of arcuate cross-section having its side margins sealed to the side margins of the flexible section, means for sealing the ends of the flexible section to and supporting the ends of the floor-section on said bulkheads, said flexible section being collapsible transversely of the conduit intermediate its ends to reduce the area in the space between the bulkheads occupied by the conduit when it is not pressurized, and means for detachably holding the flexible section expanded when the conduit is not pressurized.

12. An airplane comprising: rigid bulkheads for compartments which are spaced apart and adapted to be pressurized for altitude flying and for occupancy by personnel; and a tubular conduit for transportation of loads or personnel extending between the bulkheads, said conduit including a collapsible section of flexible material, a floor-section of arcuate cross-section having its side margins sealed to the side margins of the flexible section, including a corrugated re-inforcement, means for sealing the ends of the flexible section to and supporting the ends of the floor-section on said bulkheads, said flexible section being collapsible transversely of the conduit intermediate its ends to reduce the area in the space between the bulkheads occupied by the conduit when it is not pressurized, and means for detachably holding the flexible section expanded when the conduit is not pressurized.

13. An airplane comprising: rigid bulkheads for compartments which are spaced apart and adapted to be pressurized for altitude flying and for occupancy by personnel; and a tubular conduit for transportation of loads or personnel extending between the bulkheads, said conduit including a collapsible section of flexible material, a substantially rigid overhead member extending between the bulkheads and provided with a rail for supporting a portable carriage for transporting a load longitudinally through the conduit, and means for sealing the ends of the flexible section to the bulkheads and its longitudinal margins to the overhead member, said flexible section being collapsible transversely of the conduit intermediate its ends to reduce the area in the space between the bulkheads occupied by the conduit when it is not pressurized.

14. An airplane comprising: rigid bulkheads for compartments which are spaced apart and adapted to be pressurized for altitude flying and for occupancy by personnel; and a tubular conduit for transportation of loads or personnel extending between the bulkheads, said conduit including a collapsible section of flexible material, a substantially rigid overhead member extending between the bulkheads and provided with a rail for supporting a portable carriage for transporting a load longtudinally through the conduit, means for sealing the ends of the flexible section to the bulkheads and its longitudinal margins to the overhead member, said flexible section being collapsible transversely of the conduit intermediate its ends to reduce the area in the space between the bulkheads occupied by the conduit when it is not pressurized, and means for detachably holding the flexible section expanded when the conduit is not pressurized.

HENRY K. GROWALD.